(12) United States Patent
Holmander

(10) Patent No.: US 6,516,713 B1
(45) Date of Patent: Feb. 11, 2003

(54) PRODUCE MANDREL SYSTEM

(76) Inventor: Rudolph A. Holmander, 88 Berwick Rd., South Berwick, ME (US) 03908

( * ) Notice: Subject to any disclaimer, the term of this patent is extended or adjusted under 35 U.S.C. 154(b) by 0 days.

(21) Appl. No.: 10/003,063

(22) Filed: Nov. 1, 2001

(51) Int. Cl.[7] .............................. A23N 7/00; A47J 17/04; A47J 43/28
(52) U.S. Cl. ............................ 99/541; 99/588; 99/590; 99/591; 99/595; 99/596
(58) Field of Search .......................... 99/537–541, 584, 99/588, 590, 567, 595–599, 594, 593, 591; 426/481–483

(56) References Cited

U.S. PATENT DOCUMENTS

| 954,340 | A | * | 4/1910 | Phillips | 99/599 X |
|---|---|---|---|---|---|
| 2,307,829 | A | * | 1/1943 | Ellis | 99/598 X |
| 4,619,192 | A | * | 10/1986 | Cycyk | 99/595 X |
| 4,753,159 | A | * | 6/1988 | Eaton | 99/594 X |
| 5,558,011 | A | * | 9/1996 | Heim | 99/595 |
| 5,690,022 | A | * | 11/1997 | Chai | 99/599 X |
| 5,950,528 | A | * | 9/1999 | Wang | 99/595 X |

* cited by examiner

*Primary Examiner*—Timothy F. Simone

(57) ABSTRACT

A produce mandrel system has a driven cylinder formed with a point. A driven support receives the driven cylinder for its axial reciprocation and for rotation there within. A driven control assembly has a handle and a collar receiving the driven cylinder whereby movement of the handle will axially shift the driven cylinder. A drive cylinder is formed with needles and a guard with a point coaxial with the driven cylinder. A drive support with bearings receives the drive cylinder for its axial and rotational movement. A drive control assembly includes a motor to rotate the cylinders.

4 Claims, 3 Drawing Sheets

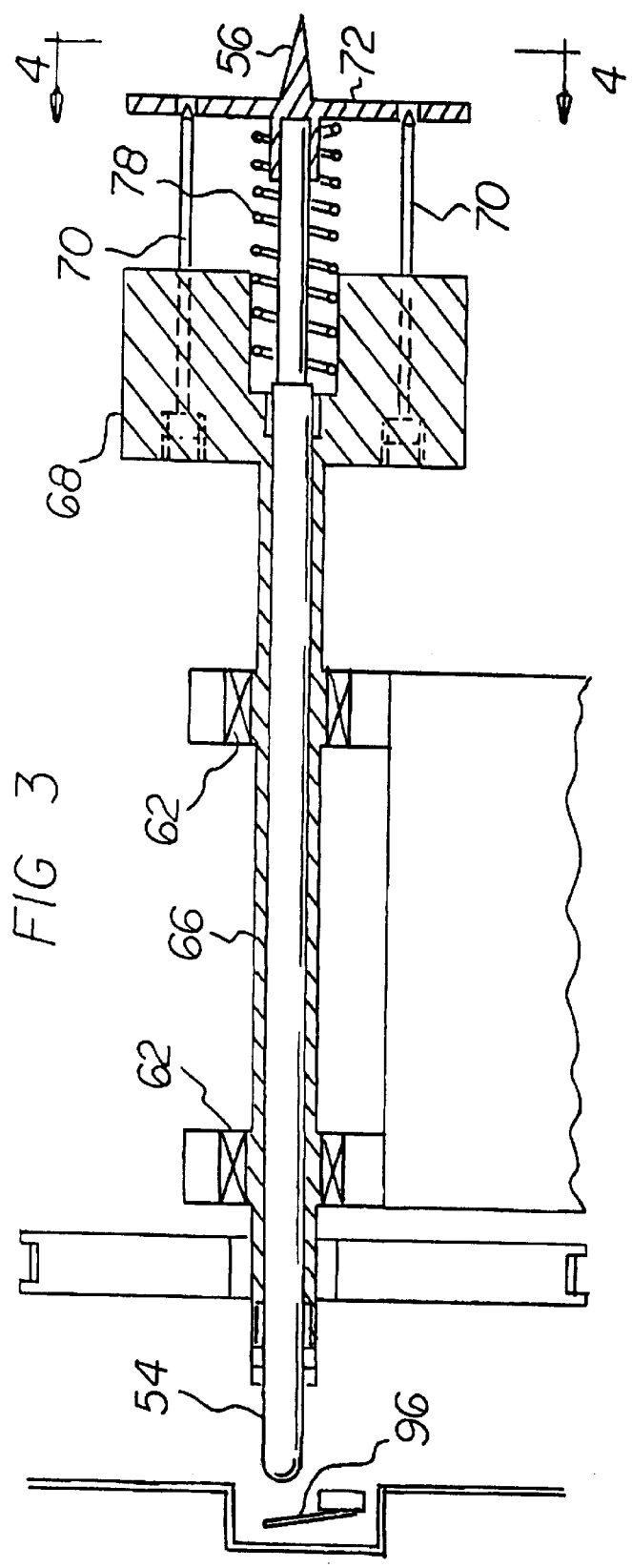
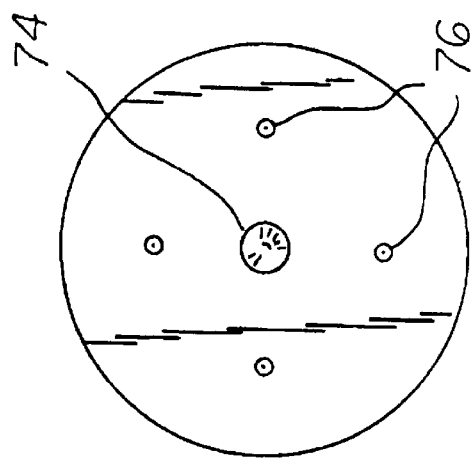

PRODUCE MANDREL SYSTEM

BACKGROUND OF THE INVENTION

1. Field of the Invention

The present invention relates to a produce mandrel system and more particularly pertains to rotating a piece of produce such as a fruit or vegetable while removing its exterior surface.

2. Description of the Prior Art

The outer skin on many fruits and vegetables are difficult to peel, labor intensive and very slow. Although the marketplace is already receiving limited delivery for prepared fruits and vegetables by hotels, restaurants and institutions, prepared fruits and produce are becoming more popular among consumers, therefore, demand upon commercial producers and processors is increasing to provide a reasonably priced product. Small to medium size processors find they are missing out on this market. As a result, processors have reached a point where automation, semi-automation or any tool to help produce peeled produce at a reasonable cost is in demand. This produce mandrel solves this problem for small to medium size processors as is and can be further developed for large producers, but the mandrel portion with its pin and guarded design would remain the same. The produce mandrel shown is in its basic primary design state, optional add-ons would include an automatic knife arrangement, automatic feed, automatic discharge, slitting, gulleting, washing, conveying and packaging to complete a fully turn-key operation.

The use of food processing equipment of known designs and configurations is known in the prior art. More specifically, food processing equipment of known designs and configurations previously devised and utilized for the purpose of removing the surface from produce through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,307,829 to D. L. Ellis discloses a citrus fruit parer. U.S. Pat. No. 4,619,192 to Cycyk et al. discloses a potato cutter. Lastly, U.S. Pat. No. 5,558,011 to Heim discloses a fruit paring and cutting apparatus.

While these devices fulfill their respective, particular objectives and requirements, the aforementioned patents do not describe a produce mandrel system that allows rotating a piece of produce such as a fruit or vegetable while removing its exterior surface.

In this respect, the produce mandrel system according to the present invention substantially departs from the conventional concepts and designs of the prior art, and in doing so provides an apparatus primarily developed for the purpose of rotating a piece of produce such as a fruit or vegetable while removing its exterior surface.

Therefore, it can be appreciated that there exists a continuing need for a new and improved produce mandrel system which can be used for rotating a piece of produce such as a fruit or vegetable while removing its exterior surface. In this regard, the present invention substantially fulfills this need.

SUMMARY OF THE INVENTION

In view of the foregoing disadvantages inherent in the known types of food processing equipment of known designs and configurations now present in the prior art, the present invention provides an improved produce mandrel system. As such, the general purpose of the present invention, which will be described subsequently in greater detail, is to provide a new and improved produce mandrel system and method which has all the advantages of the prior art and none of the disadvantages.

To attain this, the present invention essentially comprises a support table. The support table has an upper working surface in a horizontal plane. The upper working surface of the support table has a drive end and a driven end. A central operating region is provided between the drive end and the driven end. The support table has legs extending downwardly from the upper working surface. Next provided is a driven cylinder. The driven cylinder has an interior end formed with a point positioned above the central operating region of the working surface. The driven cylinder also has an exterior end over the driven end of the working surface. A central section of the driven cylinder is provided between the exterior end and the interior end. A driven support is next provided. The driven support has an upper end. A cylindrical bore is provided in the upper end. The cylindrical bore receives the driven cylinder for axial reciprocation and for rotation there within. The driven support also has a lower end mounted on the working surface adjacent to the driven end. Next provided is a driven control assembly. The driven control assembly includes a drive rod. The drive rod has an upper end formed with a handle. The drive rod also has a lower end. The lower end is provided with parallel coil springs coupled to the table adjacent to the driven end. The drive rod has an intermediate extent between the upper end and lower end. The intermediate extent is provided with pivot pin secured with respect to the table. The driven control assembly also includes a collar rotatably receiving the driven cylinder adjacent its exterior end. The driven control assembly further includes a link pivotally coupling the collar and the driven cylinder adjacent to the handle. In this manner the spring will urge the drive rod, link, collar and driven cylinder into engagement with a piece of produce and reverse movement of the handle by an operator will reverse the movement of the driven cylinder. A drive cylinder is next provided. The drive cylinder has an interior end adjacent to a point positioned above the central operating region of the working surface. The drive cylinder also has an exterior end over the drive end of the working surface. A central section of the drive cylinder is provided between the interior end and the exterior end. The drive cylinder is coaxial with the driven cylinder. Next provided is a drive support. The drive support has an upper end. The upper end has axially spaced cylindrical bearings receiving the drive cylinder for axial reciprocation and for rotation there within. The drive support also has a lower end mounted on the working surface adjacent to the drive end. A cylindrical sleeve is next provided. The cylindrical sleeve has an exterior surface mounted in the bearings for rotational movement. The cylindrical sleeve also has an interior surface receiving the drive cylinder. In this manner, the drive cylinder is capable of axial and rotational movement. The sleeve is formed with an enlarged cylindrical block. The block has interiorly extending pins. The block has a circular plate with a point aligned with the drive cylinder and supplemental holes for the passage of the point of the drive cylinder. A coil spring encompasses the drive cylinder with one end contacting the block and one end contacting the plate for urging their separation. A drive control assembly is next provided. The drive control assembly includes a motor mounted to the table. A variable speed drive pulley is mounted to the rotor of the motor. A driven pulley is mounted on the sleeve. A drive belt couples the pulleys. The drive control assembly also includes a foot control to activate the motor, sleeve and drive cylinder at a preselected speed and also the driven cylinder when a piece of produce is coupled between the cylinders. Lastly, a safety switch is provided. The safety switch is mounted adjacent to the exterior end of the drive cylinder and adapted to be contacted by axial movement of the drive cylinder to allow rotation of the motor, sleeve, and cylinders only when a piece of produce is supported by the cylinders but to preclude such rotation when no piece of produce is so supported.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or Illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved produce mandrel system which has all of the advantages of the prior art food processing equipment of known designs and configurations and none of the disadvantages.

It is another object of the present invention to provide a new and improved produce mandrel system which may be easily and efficiently manufactured and marketed.

It is further object of the present invention to provide a new and improved produce mandrel system which is of durable and reliable constructions.

An even further object of the present invention is to provide a new and improved produce mandrel system which is susceptible of a low cost of manufacture with regard to both materials and labor, and which accordingly is then susceptible of low prices of sale to the consuming public, thereby making such produce mandrel system economically available to the buying public.

Even still another object of the present invention is to provide a produce mandrel system for rotating a piece of produce such as a fruit or vegetable while removing its exterior surface.

Lastly, it is an object of the present invention to provide a new and improved produce mandrel system with a driven cylinder formed with a point. A driven support receives the driven cylinder for its axial reciprocation and for rotation there within. A driven control assembly has a handle and a collar receiving the driven cylinder whereby movement of the handle will axially shift the driven cylinder. A drive cylinder is formed with needles and a guard with a point coaxial with the driven cylinder. A drive support with bearings receives the drive cylinder for its axial and rotational movement. A drive control assembly includes a motor to rotate the cylinders.

These together with other objects of the invention, along with the various features of novelty which characterize the invention, are pointed out with particularity in the claims annexed to and forming a part of this disclosure. For a better understanding of the Invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken at line 3—3 of FIG. 2.

FIG. 4 is a front elevational view taken at line 4—4 of FIG. 3.

The same reference numerals refer to the same parts throughout the various Figures.

DESCRIPTION OF THE PREFERRED EMBODIMENT

Figure 1:
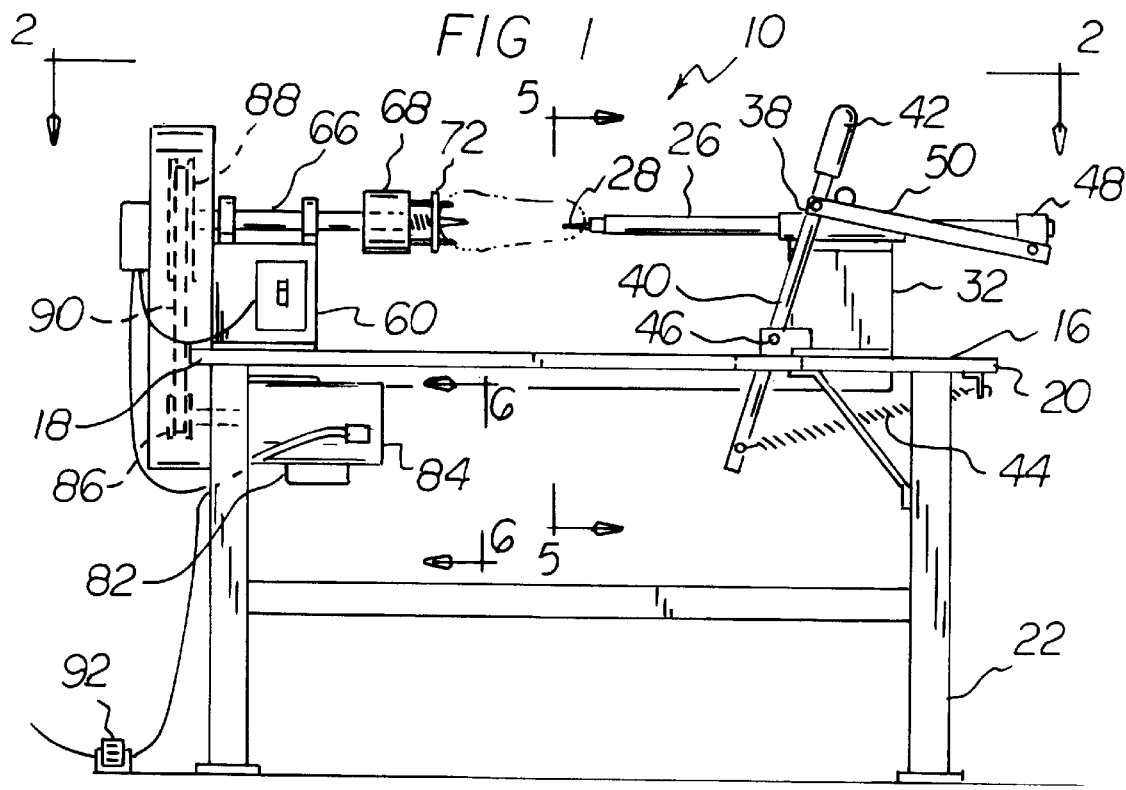
FIG. 1 is a side elevational view of a produce mandrel system constructed in accordance with the principles of the present invention.

With reference now to the drawings, and in particular to FIG. 1 thereof, the preferred embodiment of the new and improved produce mandrel system embodying the principles and concepts of the present invention and generally designated by the reference numeral 10 will be described.

The present invention, the produce mandrel system 10 is comprised of a plurality of components. Such components in their broadest context include a driven cylinder, a driven support, a driven control assembly, a drive cylinder, a drive support, and a driven control assembly.

First provided is a support table 14. The support table has an upper working surface 16 in a horizontal plane. The upper working surface of the support table has a drive end 18 and a driven end 20. A central operating region is provided between the drive end and the driven end. The support table has legs 22 extending downwardly from the upper working surface.

Next provided is a driven cylinder 26. The driven cylinder has an interior end formed with a point 28 positioned above the central operating region of the working surface. The driven cylinder also has an exterior end over the driven end of the working surface. A central section of the driven cylinder is provided between the exterior end and the interior end.

A driven support 32 is next provided. The driven support has an upper end. A cylindrical bore 34 is provided in the upper end. The cylindrical bore receives the driven cylinder for axial reciprocation and for rotation there within. The driven support also has a lower end mounted on the working surface adjacent to the driven end.

Next provided is a driven control assembly 38. The driven control assembly includes a drive rod 40. The drive rod has an upper end formed with a handle 42. The drive rod also has a lower end. The lower end is provided with parallel coil springs 44 coupled to the table adjacent to the driven end. The drive rod has an intermediate extent between the upper end and lower end. The intermediate extent is provided with pivot pin 46 secured with respect to the table. The driven control assembly also includes a collar 48 rotatably receiving the driven cylinder adjacent its exterior end. The driven control assembly further includes a link 50 pivotally coupling the collar and the driven cylinder adjacent to the handle. In this manner the spring will urge the drive rod, link, collar and driven cylinder into engagement with a piece of produce and reverse movement of the handle by an operator will reverse the movement of the driven cylinder.

A drive cylinder 54 is next provided. The drive cylinder has an interior end adjacent to a point 56 positioned above the central operating region of the working surface. The drive cylinder also has an exterior end over the drive end of the working surface. A central sect-on of the drive cylinder is provided between the interior end and the exterior end. The drive cylinder is coaxial with the driven cylinder.

Figure 2:
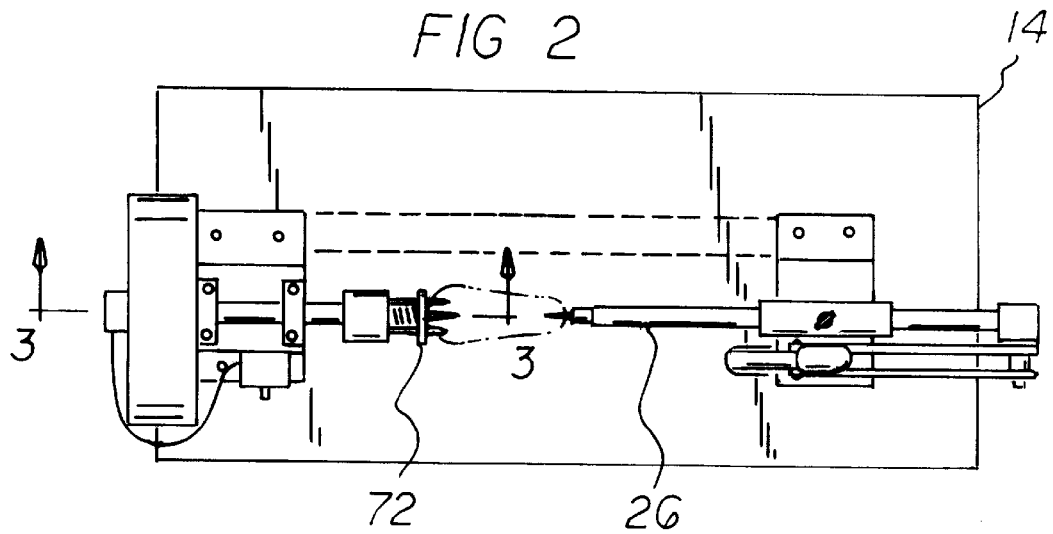
FIG. 2 is a top plan view taken at line 2—2 of FIG. 1.
Figure 5:
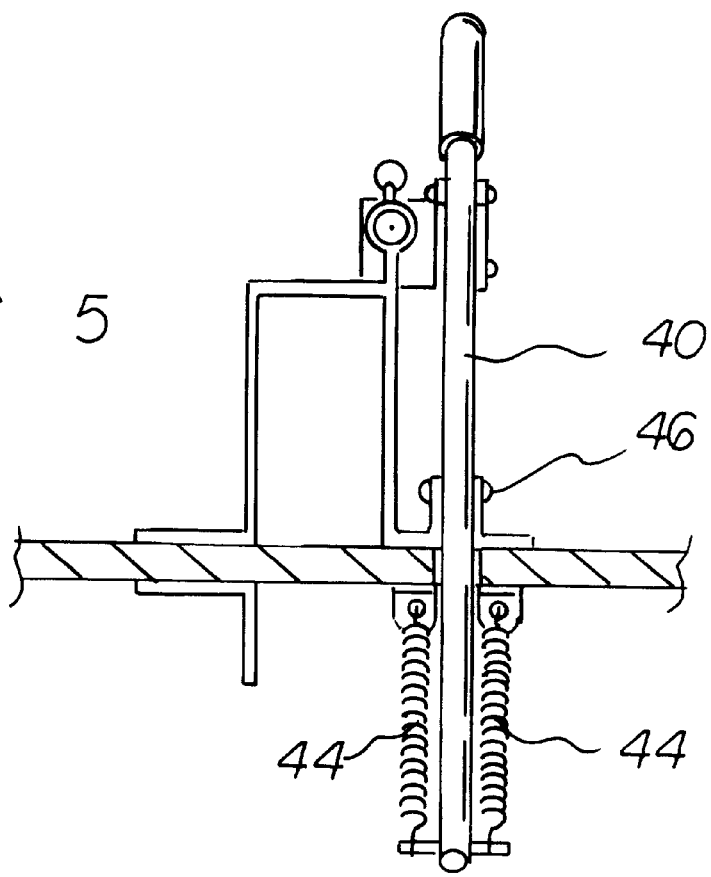
FIG. 5 is a cross sectional view taken at line 5—5 of FIG. 1.
Figure 6:
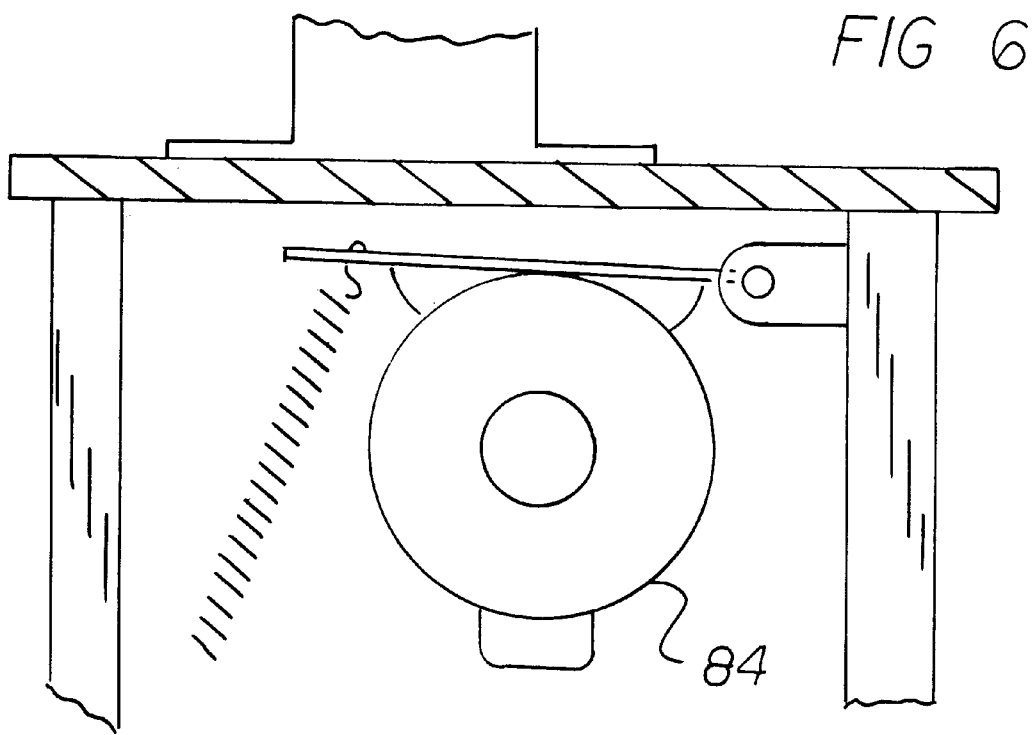
FIG. 6 is a side elevational view taken at line 6—6 of FIG. 1.

Next provided is a drive support 60. The drive support has an upper end. The upper end has axially spaced cylindrical bearings 62 receiving the drive cylinder for axial reciprocation and for rotation there within. The drive support also has a lower end mounted on the working surface adjacent to the drive end. A rigid support beneath the working surface couples the drive support and the driven support. Note FIG. 2.

A cylindrical sleeve 66 is next provided. The cylindrical sleeve has an exterior surface mounted in the bearings for rotational movement. The cylindrical sleeve also has an interior surface receiving the drive cylinder. In this manner, the drive cylinder is capable of axial and rotational movement. The sleeve is formed with an enlarged cylindrical block 68. The block has interiorly extending pins 70. The block has a circular plate 72 with a point 56 aligned with the drive cylinder 54 and supplemental holes 76 for the passage of the point of the drive cylinder. Any number of pins could be utilized in any appropriate pattern as a function of produce being peeled. A coil spring 78 encompasses the drive cylinder with one end contacting the block and one end contacting the plate for urging their separation.

A drive control assembly 82 is next provided. The drive control assembly includes a motor 84 mounted to the table. A variable speed drive pulley 86 is mounted to the rotor of the motor. A driven pulley 88 is mounted on the sleeve. A drive belt 90 couples the pulleys. The drive control assembly also includes a foot control 92 to activate the motor, sleeve and drive cylinder a preselected speed and also the driven cylinder when a piece of produce is coupled between the cylinders.

Lastly, a safety switch 96 is provided. The safety switch is mounted adjacent to the exterior end of the drive cylinder and adapted to be contacted by axial movement of the drive cylinder to allow rotation of the motor, sleeve, and cylinders only when a piece of produce is supported by the cylinders but to preclude such rotation when no piece of produce is so supported.

The drive cylinder or chuck with its pointed end and the circular plate with its needles for holding produce in combination with the driven cylinder or idler shaft with its pointed end for holding produce may together be considered a mandrel.

The present invention is a produce mandrel, a special mandrel specifically designed to facilitate the peeling of fruits and vegetables using external energy to drive the spinning support cylinders and manual or automatic power for peel removal action. it is used in the production of commercial food processing, specifically produce, to speed the peeling process and increase productivity.

In use, the operator holds a special blade in his hand. The blade may be controlled by an automatic feed mechanism. The blade style depends on whether fruit or vegetables are being peeled. While the cylinder rotates, the blade is moved from side to side over the produce to achieve the desired result.

More specifically, the operator stands in front of the table high machine. The drive cylinder is to the left and the spring tensioned driven cylinder is on the right side. The handle is drawn to the right to open the area and the produce is aligned left to fit first using the point in the center to align with the dimple or center of the produce and the handle on the right is slowly brought in to meet the opposite side of the produce and the point on the idler shaft is aligned to the right side on center of the produce on the lateral plane, then with slight pressure from the ergonomical handle, the produce is forced into the small diameter stainless steel pins which have been guarded at the sharp points and then penetrates the produce while depressing the pointer into the dimple, depressing the safety switch simultaneously, the idler shaft pointer with its larger diameter penetrates the stem side proportionally with equalized pressure bringing the produce to a firm resting place in its ends using minimal penetration and protecting produce integrity. The spring loaded cylinders hold the produce in place and the safety switch facilitates ease and safety. The operator depresses the foot switch and the motor rotates the produce in the downward direction away from the operator and the operator holds the peeling edge free hand for manual operation allowing even pressure through the odd shape turning of the produce with the outer peel or skin being removed leaving the maximum produce yield. The operator then removes his foot from the foot switch. The produce can then be removed from the mandrel and the process is repeated.

The unique character of this produce mandrel is its all stainless steel components for food contact required by the USDA for use in the processing of food products for human consumption.

The design of the drive cylinder includes a safety plate which covers the replaceable stainless steel pins when the machine is idle preventing injury, a point that aids in the centering of the produce, the diameter is designed as a support backing with four triangular diameter-mounting locations, ¼ inch diameter apart, for various produce, safety switch control which prevents drive cylinder from spinning until produce has been loaded which helps prevent injury and gives operator total control, and the head of the drive cylinder is extended away from its mounting allowing full view of the area beyond the produce allowing for safe usage and clearances which prevents impeding the peeling knives in operation and the working area.

The driven cylinder is unique. Its heavy duty $^{11}/_{16}$" stainless steel diameter shaft slides through sintered bearings that offer minimal resistance and extends the full working length of 18" and closes its point in line with the point of the drive cylinder and locks to leave no open sharp edges when machine is off. Its ergonomical handle allows the operator full control and ease of operation. While supporting the produce with his left hand, the operator holds the handle with his right hand and levers move the slide rod giving added pressure to penetrate produce and safely handle the produce. In line with the rotating drive cylinder, ample working area is provided for ease of operation and safety.

Standard features include a heavy duty constructed work platform. The table is 24" wide, 48" long, 38" high with a full H pattern design constructed from 3-½" square tubular steel with 4"×4" steel mounting plates for mounting casters and table top. The steel is cleaned and primed and painted white for sanitary conditions. The table top is solid ¾" plywood sealed with 3 coats of polyurethane and brought to a smooth glass-like finish.

Another standard feature is the under structure. It incorporates 2"×2" angle iron which aids in table top support while joining the rotating drive cylinder mounting base and driven cylinder mounting base together. It is cemented with silicone and bolted with ⅜" stainless steel hardware.

A further standard feature is the ⅓ hp 115-volt motor supported by the understructure. The motor drives the unit with its spring tensioned variable speed pulley.

An on-off power switch is a standard feature. It is located conveniently for the operator to turn the power off if needed.

The standard feature pulley and belt drive guard are made of non-rust material and structurally supported.

Finally, casters are a standard feature. The casters include two rigid casters and 2 locking swivel caster.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present -invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A produce mandrel system for rotating a piece of produce such as a fruit or vegetable while removing its exterior surface comprising, in combination:

a support table having an upper working surface in a horizontal plane with a drive end and a driven end and with a central operating region there between and having downwardly extending legs;

a driven cylinder with an interior end formed with a point positioned above the central operating region of the working surface and with an exterior end over the driven end of the working surface and a central section there between;

a driven support having an upper end with a cylindrical bore receiving the driven cylinder for axial reciprocation and for rotation there within, the driven support having a lower end mounted on the working surface adjacent to the driven end;

a driven control assembly including a drive rod with an upper end formed with a handle and a lower end provided with parallel coil springs coupled to the table adjacent to the driven end and an intermediate extent there between with a pivot pin secured with respect to the table, the driven control assembly also including a collar rotatably receiving the driven cylinder adjacent its exterior end and a link pivotally coupling the collar and the driven cylinder adjacent to the handle whereby the spring will urge the drive rod, link, collar and driven cylinder into engagement with a piece of produce and reverse movement of the handle by an operator will reverse the movement of the driven cylinder;

a drive cylinder with an interior end adjacent to a point positioned above the central operating region of the working surface and with an exterior end over the drive end of the working surface and a central section there between, the drive cylinder being coaxial with the driven cylinder;

a drive support having an upper end with axially spaced cylindrical bearings receiving the drive cylinder for axial reciprocation and for rotation there within, the drive support having a lower end mounted on the working surface adjacent to the drive end;

a cylindrical sleeve with an exterior surface mounted in the bearings for rotational movement and with an interior surface receiving the drive cylinder whereby the drive cylinder is capable of axial and rotational movement, the sleeve being formed with an enlarged cylindrical block with interiorly extending pins and a circular plate with a point aligned with the drive cylinder and supplemental holes for the passage of the point of the drive cylinder and with a coil spring encompassing the drive cylinder with one end contacting the block and one end contacting the plate for urging their separation;

a drive control assembly including a motor mounted to the table with a variable speed drive pulley mounted to the rotor of the motor and a driven pulley mounted on the sleeve with a drive belt coupling the pulleys, the drive control assembly also including a foot control to activate the motor, sleeve and drive cylinder at a preselected speed and also the driven cylinder when a piece of produce is coupled between the cylinders; and a safety switch mounted adjacent to the exterior end of the drive cylinder and adapted to be contacted by axial movement of the drive cylinder to allow rotation of the motor, sleeve, and cylinders only when a piece of produce is supported by the cylinders but to preclude such rotation when no piece of produce is so supported.

2. A produce mandrel system comprising:

a drive cylinder formed with needles and a spring loaded guard and a point;

a drive support receiving the drive cylinder for its axial reciprocation and for rotation there within;

a drive control assembly including a motor to rotate the cylinders;

a driven cylinder formed with a point coaxial with the drive cylinder;

a driven support with bearings receiving the driven cylinder for its axial and rotation movement; and a driven control assembly with a handle and a collar receiving the driven cylinder whereby movement of the handle will axially shift the driven cylinder.

3. The system as set forth in claim 2 and further including a cylindrical sleeve with an exterior surface mounted in the bearings for rotational movement and with an interior surface receiving the drive cylinder, the sleeve being formed with an enlarged cylindrical block with interiorly extending pins and a circular plate with a central hole for passage of the point of the drive cylinder and supplemental holes for the passage of the point and with a coil spring encompassing the drive cylinder with one end contacting the block and one end contacting the plate for urging their separation.

4. The system as set forth in claim 2 and further including a safety switch mounted adjacent to the exterior end of the drive cylinder and adapted to be contacted by axial movement of the drive cylinder to allow rotation of the motor and cylinders only when a piece of produce is supported by the cylinders but to preclude such rotation when no piece of produce is so supported.

* * * * *